United States Patent [19]

Smith et al.

[11] Patent Number: 5,167,024
[45] Date of Patent: Nov. 24, 1992

[54] POWER MANAGEMENT FOR A LAPTOP COMPUTER WITH SLOW AND SLEEP MODES

[75] Inventors: R. Steven Smith, Saratoga; Mike S. Hanlon; Robert L. Bailey, both of San Jose, all of Calif.

[73] Assignee: Apple Computer, Inc., Cupertino, Calif.

[21] Appl. No.: 845,781

[22] Filed: Mar. 5, 1992

Related U.S. Application Data

[63] Continuation of Ser. No. 405,637, Sep. 8, 1989, abandoned.

[51] Int. Cl.⁵ .......................... G06F 13/10; G06F 9/00
[52] U.S. Cl. .................... 395/375; 395/550; 364/273.1; 364/DIG. 1; 364/270.3
[58] Field of Search ................................ 395/375, 550

[56] References Cited

U.S. PATENT DOCUMENTS

| | | | |
|---|---|---|---|
| 4,019,068 | 4/1977 | Bormann | 307/205 |
| 4,074,351 | 2/1978 | Boone et al. | 364/200 |
| 4,151,611 | 4/1979 | Sugawara et al. | 365/227 |
| 4,279,020 | 7/1981 | Christian et al. | 364/900 |
| 4,293,927 | 10/1981 | Hoshii | 364/900 |
| 4,317,181 | 2/1982 | Teza et al. | 364/707 |
| 4,381,552 | 4/1983 | Nocilini et al. | 364/900 |
| 4,409,665 | 10/1983 | Tubbs | 364/707 |
| 4,611,289 | 9/1986 | Coppola | 364/492 |
| 4,615,005 | 9/1986 | Maejima et al. | 364/200 |
| 4,698,748 | 10/1987 | Juzswik et al. | 395/750 |
| 4,712,196 | 12/1987 | Uesugi | 365/229 |
| 4,747,041 | 5/1988 | Engel et al. | 364/707 |
| 4,809,163 | 2/1989 | Hirosawa | 364/200 |
| 4,851,987 | 7/1989 | Day | 364/200 |
| 4,907,150 | 3/1990 | Arroyo et al. | 364/200 |
| 4,980,836 | 12/1990 | Carter et al. | 364/200 |

FOREIGN PATENT DOCUMENTS 1723394  2/1986  European Pat. Off. ............ 364/707

*Primary Examiner*—Lawrence E. Anderson
*Attorney, Agent, or Firm*—Blakely, Sokoloff, Taylor & Zafman

[57] ABSTRACT

A power manager within a portable laptop computer provides power and clocking control to various units within the computer in order to conserve battery power. Transistor switches controlled by the power manager control the distribution of power and/or clock signals to the various units within the computer. The power manager includes a software routine for continually monitoring the various units and when these units are either not needed and/or not currently in use, power and/or clock signals are removed from a given unit.

5 Claims, 2 Drawing Sheets

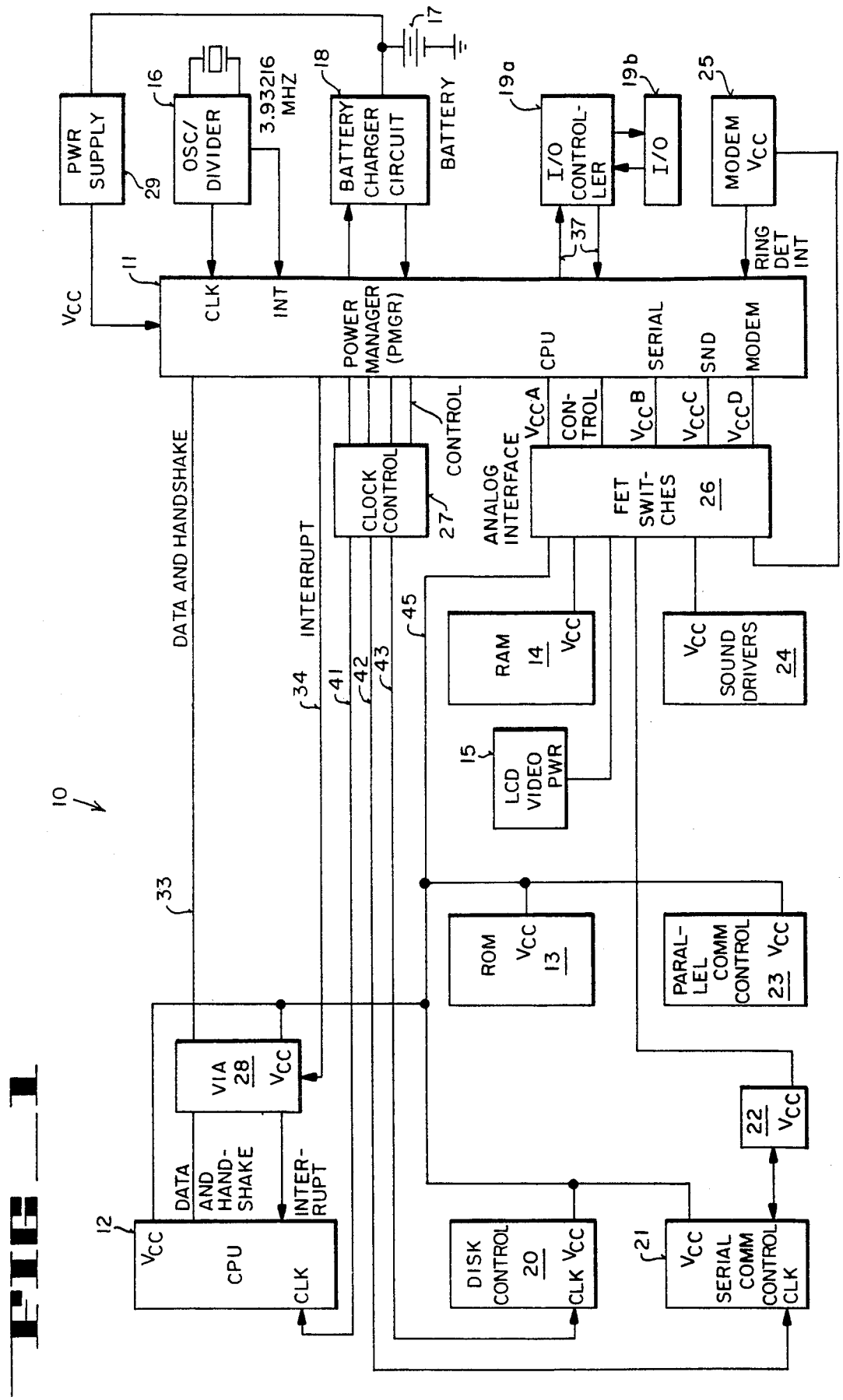

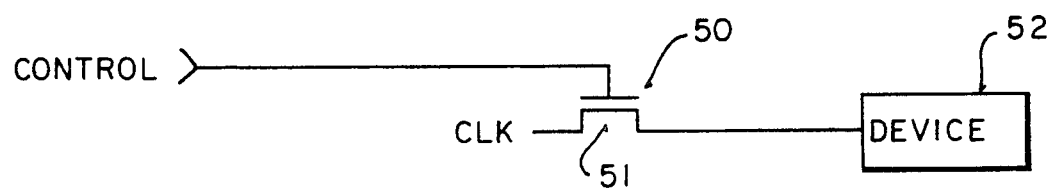
FIG_2
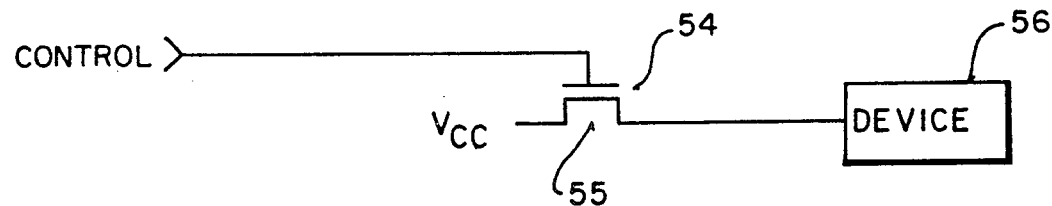
FIG_3

POWER MANAGEMENT FOR A LAPTOP COMPUTER WITH SLOW AND SLEEP MODES

This is a continuation of application Ser. No. 07/405,637, filed Sep. 8, 1989, now abandoned.

BACKGROUND OF THE INVENTION

1. Field of the Invention

The present invention relates to a power distribution scheme in a portable computer and, more specifically, to power management in a laptop computer.

2. Prior Art

Power consumption in an electronic device is always a significant concern and a power supply must be designed to adequately power the device. Aside from the capability of the power supply to provide ample power to power the corresponding device, heat dissipation, physical size, weight, efficiency, and other related characteristics are paramount in designing or selecting the power source. These characteristics become exceptionally critical when the device the power supply is to support is a self-sufficient portable unit.

In many portable units, a self-supporting power source, such as a battery, is used to provide the power when the unit is decoupled from its main or external power source, such as 110 Volt AC (ordinary house current). Typically a battery is used to provide the independent and portable power source. In some instances the battery functions as an auxiliary power source to maintain certain critical circuits active, such as keeping the memory alive to retain any information stored in the memory. In other instances, the battery functions as the main power source to fully power the device.

In the area of information processing, miniaturization of processing devices has permitted the portability of computing devices. One of the first such portable processing devices was a hand held calculator, wherein the calculator operated from a battery power source and could easily be carried about by the user. The battery would power all of the functions of the calculator and the user could readily transport the calculator without any attachment to an external power source. The batteries were either replaced or recharged. The earliest calculators simply had an on/off state in which full power was available during the on state and the power was completely shut off during the off state. Bacause of the volatile nature of many early semiconductor memories, information stored in such volatile memories were lost when the calculator was turned off. Subsequent calculators attempted to incorporate nonvolatile memory, or in the alternative, standby power was provided to such a memory when the device was turned off, so that the memory retained whatever information was present. More advanced schemes were devised to monitor various functions, so that power was removed from various elements when those elements were not needed. Further, a time-out scheme was devised to put the calculator in a stand-by mode, such as when a key was not depressed after a certain time period, in order to preserve power. All of these features were devised primarily to extend the time period that the device could operate from its internal power source.

When the processing technology was expanded beyond a simple calculator to encompass personal desk top computers, additional constraints were placed to power consumption and management control schemes. Aside from the additional circuitry, additional memory devices consumed considerable amounts of power. These memory devices include semiconductor devices, such as read-only memories (ROMs) and random-access memories (RAMs) which include volatile and nonvolatile memories, floppy disk drives and hard disk drives and other magnetic media. Also, additional power is required to power the display unit which typically includes a viewing screen. Various schemes were devised to monitor and control the power distribution during on/off states.

However, as the personal desk top computer systems are made portable, it is desirable to provide a computer which contains a fully contained power source so that the computer is completely portable. These self-sufficient computer systems are typically referred to as laptops (because of the small physical size and light weight) and are designed to operate for a certain number of hours from its internal power source, which is typically a battery. Although a variety of the portable calculator technology can be implemented within such a laptop, additional constraints are placed in that the additional circuitry, memory, viewing screen and any peripheral devices attached to the system will necessarily consume additional power. In order to extend the self-sustaining time period of these laptops while keeping the battery size and weight to a minimum, a sophisticated power management scheme is required to provide power only to those circuits and devices which require such power and to remove power, or at least to make a given circuit enter a low power consumption mode, when that circuit is not needed. The management scheme must also continually monitor the various circuits and devices in order that power can be applied immediately to activate such circuits and devices when needed.

The present invention provides for such a power management apparatus for a laptop computer in order to extend the self-sustaining time period so that the laptop computer can operate for an extended period of time once external power is disconnected.

3. PRIOR ART REFERENCES

A number of prior art references are known for monitoring and controlling the consumption of power to a device or to a portion of a device including a means of providing a timeout when user interaction has not occurred for a given time period. However, these references pertain to the simpler calculator technology or to portions of a computer system and fail to disclose the sophisticated power management scheme for a laptop of the present invention.

The references are:

1. U.S. Pat. No. 4,019,068, issued Apr. 19, 1977, for Low Power Output Disable Circuit For Random Access Memory;
2. U.S. Pat. No. 4,074,351, issued Feb. 14, 1978 for Variable Function Programmed Calculator;
3. U.S. Pat. No. 4,151,611, issued Apr. 24, 1979 for Power Supply Control System For Memory Systems;
4. U.S. Pat. No. 4,293,927, issued Oct. 6, 1981 for Power Consumption Control System For Electronic Digital Data Processing Devices;
5. U.S. Pat. No. 4,279,020, issued Jul. 14, 1981 for Power Supply Circuit For A Data Processor;
6. U.S. Pat. No. 4,381,552, issued Apr. 26, 1983 for Standby Mode Controller Utilizing Microprocessor;

7. U.S. Pat. No. 4,409,665, issued Oct. 11, 1983 for Turn-Off-Processor Between Keystrokes;

8. U.S. Pat. No. 4,611,289, issued Sept. 9, 1986 for Computer Power Management System;

9. U.S. Pat. No. 4,615,005, issued Sep. 30, 1986 for Data Processing Apparatus With Clock Signal Control By Microinstruction For Reduced Power Consumption And Method Therefor; and 10. U.S. Pat. No. 4,712,196, issued Dec. 8, 1987 for Data Processing Apparatus.

SUMMARY OF THE INVENTION

The present invention describes a power manager for use in a laptop computer. The laptop computer is a fully self-sufficient computer which is powered by an internal battery when the computer is disconnected from an external power source. Because power conservation is paramount to sustain the computer as long as possible from the internal battery, a power manager is provided to monitor and control various circuit operations. Various units of the computer, including peripheral units, generally function equivalently to well-known personal desktop computers. However, the power source to the various devices are controlled by the power manager and a plurality of transistor switches are used to switch the power source to the various devices. The operation of these switches is controlled by the power manager. Additionally, various clock signals are also coupled through switches which are controlled by the power manager so that the clock signals can be disconnected from certain units of the computer.

The power manager continually monitors various circuit functions such that devices not in use have their power sources or clock signals disconnected in order to deactivate devices to conserve battery power. The removal of clock signals from those units having clock control places these various units into an inactive state. However, because power is still applied to these units, various internal states retain their current state until the clock signal is restored.

The power manager is capable of operating in one of three modes of operation. In a first mode the computer operates in a normal active mode where most of the units are active at all times and/or some of the other units are caused to be made active when needed. A second state is a sleep state in which the computer enters into an inactive state and the power manager continues to monitor various circuit conditions. When a certain predetermined condition occurs, it causes the computer to awake from its sleep state. A third state is an intermediate state in which the power manager controls the frequency of the clock signals to be decreased such that the power consumption drops by approximately 25-30% from the normal active mode.

BRIEF DESCRIPTION OF THE DRAWINGS

FIG. 1 is a circuit block diagram of the various units of the laptop computer and showing power lines, clock signal lines and control lines pertaining to the power management scheme of the present invention.

FIG. 2 is a circuit schematic diagram showing an example of a transistor switch utilized to control the switching of a clock signal to a given device.

FIG. 3 is a circuit schematic diagram showing an example of a transistor switch utilized to control the switching of power to a given device.

DETAILED DESCRIPTION OF THE PRESENT INVENTION

A power management system for a laptop computer is described. In the following description, numerous specific details are set forth, such as specific circuits, devices, etc., in order to provide a thorough understanding of the present invention. It will be obvious, however, to one skilled in the art that the present invention may be practiced without these specific details. In other instances, well-known circuits and signal lines have not been described in detail in order not to unnecessarily obscure the present invention.

Referring to FIG. 1, an architecture for a portable computer 10 is shown, including the power manager (PMGR) 11 of the present invention. Although computer 10 can be of a variety of computers, computer 10 of the present invention is a portable computer and, more specifically, a laptop computer which is capable of operating without an external power source. Aside from the PMGR 11, computer 10 is comprised of a CPU 12, read-only memory (ROM) 13, random-access memory (RAM) 14, liquid crystal display (LCD) unit 15 which includes a viewing screen and associated video circuitry, crystal controlled clock and oscillator 16, a battery 17, a battery charger circuit 18 and an input-/output (I/O) unit 19 which includes an I/O controller 19a and at least one I/O device 19b. These components are typically present in most desktop or portable computer systems. Computer 10 of the present invention further includes a disk controller 20, a serial communication controller 21 and its drivers 22, a parallel communications controller 23, sound circuit and drivers 24, and a modem 25. It is to be appreciated that although units 20-25 are included within computer 10 that these devices are typically a design choice and the computer 10 can readily operate as a functioning computer without the presence of these units.

Several additional units are included within computer 10 to operate with the PMGR unit 11. Analog interface unit 26, clock control unit 27 and an internal interface unit, referred to as a via unit 28, are included to function in conjunction with the PMGR 11. It is to be appreciated that units 12-25 are devices used in prior art computers and such description and operation of these units are not included herein. Units 12-25, except for unit 17 and 18, are available with the Macintosh ™ brand computers of Apple Computer Inc., of Cupertino, Calif.

In functional terms, CPU 12 is the main processing unit for computer 10 and in the preferred embodiment is a 68000 based (part numbers 68000, 68020 and 68030) processor manufactured by Motorola Corporation. ROM 13 is used to store the operating system of the computer 10 as well as other proprietary programs, such as file directory routines. RAM 14 is utilized as the internal memory of the computer for accessing of data. The LCD display 15 with its associated video circuitry provides for the presentation of a display on a viewing screen. The crystal operated clock 16 provides for the necessary timing reference signals which are needed for the operation of computer 10. The battery 17 powers computer 10, permitting computer 10 to be a fully portable unit. Battery charger circuit 18 monitors the level of the battery 17 as well as charging the battery 17 when computer 10 is coupled to an external power source such as 110 Volts AC.

The I/O unit 19 interfaces with various I/O devices, such as keyboards and cursor control devices, such as a "mouse" or a trackball. The disk controller unit 20 is used to access a disk storage medium, such as a floppy disk. In computer 10, a hard disk is coupled and accessed by the parallel communications controller 23. The serial communication controller 21 and its drivers 22 are utilized to provide serial communication, such as supporting a RS-232 protocol. The sound circuits and drivers of sound unit 24 are utilized to generate various audio signals from computer 10. Modem 25 is typically an external device, however, in this instance it is included within computer 10 to provide full modem capability, in order that the portable computer 10 has capabilities of interfacing with telecommunication lines at various remote locations.

The power management apparatus of the present invention is comprised of PMGR 11, analog interface unit 26, clock control unit 27 and via unit 28. Functionally, PMGR 11 is an intelligent assistant to the CPU 12, wherein PMGR 11 monitors the state of charge of battery 17, controls the power consumption of the various subsystems, includes a real time clock which frequency is determined by the clock circuit 16, interfaces to the internal modem 25, as well as an interface to the I/O peripheral devices 19b through I/O controller 19a. It is to be appreciated that PMGR 11 of the preferred embodiment includes its own ROM, RAM, timers, analog to digital converters, and general purpose I/O lines. Although a variety of devices can be used to perform the functions of PMGR 11, the preferred embodiment uses part number 50753, which is a semiconductor chip manufactured by Mitsubishi Corporation.

The software stored within PMGR 11 of the present invention provides for three main functions in controlling the power management of the various devices. These functions are receiving commands from the CPU 12 and performing in response to these commands, controlling the transfer of communications between the PMGR and peripheral units coupled to the I/O controller unit 19, and monitoring the system as well as providing the timer to maintain the real time clock. An 8-bit data bus and two handshake lines provide the coupling between CPU 12 and PMGR 11 through the via unit 28. The 8-bit databus is used to transfer command and data between CPU 12 and PMGR 11. This 8-bit communication is achieved by the use of a two line handshaking scheme wherein commands are provided by CPU 12 and replies are provided by PMGR 11 on data and handshake lines 33.

Once the command is sent from CPU 12 through via unit 28 to PMGR 11 and the handshake is completed, PMGR 11 decodes the command and executes it. If no reply data is to be returned, PMGR 11 waits for the handshake for the next command to begin from CPU 12. If reply data is to be returned, PMGR 11 begins the reply handshake and returns the requested data. In the preferred embodiment commands and replies are transmitted in a protocol comprising of a command/reply byte, a count byte and optional data bytes.

Once every 1/60 of a second (frequency of 60 Hz), the clock oscillator 16 generates an interrupt to PMGR 11 and this interrupt is coupled to CPU 12 on line 34. When this interrupt is generated, PMGR 11 closes the I/O channel from I/O controller 19 and further, will not respond to any handshake requests from CPU 12. The interrupt on line 34 causes CPU 12 to suspend the data transfer to PMGR 11. During this interrupt cycle, PMGR 11 performs its periodic monitoring routines which include updating the real time clock, checking the battery power level and sending an auto poll command. The auto poll command is associated with the auto poll scheme of the preferred embodiment in which the CPU 12, through PMGR 11, automatically interrogates (polls) devices coupled to bus 37 to determine the presence of data for transfer.

PMGR 11 contains the necessary I/O transceiver functions for transfer of information between PMGR 11 and I/O unit 19 on bus 37. Packets of information to be sent on bus 37 to I/O unit 19 are sent by CPU 12 to PMGR 11 in the data portion of the command signal. Data received by PMGR 11 from I/O controller 19 is buffered internally and once received, this data is stored within PMGR 11 until requested by CPU 12. If a new I/O command was transmitted by CPU 12 during a previous command/execution cycle, the new command and its corresponding data is supplied as the next I/O command which is to be sent. If the I/O device has any data to return, PMGR 11 receives, buffers and stores the data. When the data is completely received, PMGR 11 interrupts CPU 12 on interrupt line 34 and CPU 12 responds to the interrupt by determining the source of the interrupt and data is obtained from PMGR 11.

PMGR 11 includes a one second timer which is based on the 60 Hz frequency of clock 16. PMGR 11 also includes its own internal clock which performs as a real time clock. The one second timer is used to supply a wake up timer and create the one second interrupt for triggering the various monitoring functions. That is, as each new second is counted within PMGR 11, a number of periodic operations occur. Firstly, the real time clock and the wake up timer (if enabled) are updated. The wake up timer is an internal alarm clock which is used to provide an alarm/signal whenever the real time clock coincides with the time set for the wake up timer (if enabled). Next, computer 10's power system and battery 17 are checked to determine the battery power level and if a low battery condition exists. The battery charger circuit 18 includes means for monitoring the level of the battery and for determining if the power level drops below a predetermined level. Then, the internal temperature is also checked followed by the interrupt to the CPU. Subsequently PMGR 11 sends any pending I/O transactions to CPU 12.

It is to be appreciated that via unit 28 performs the function of an interface unit between the CPU 12 and PMGR 11. Via unit 28 includes general purpose I/O devices, internal timers, interrupt generators, as well as input and output ports. However, it is to be noted that PMGR 11 can be readily adapted to operate without such a via unit 28 without departing from the spirit and scope of the present invention.

In order to provide the control over the consumption of power by computer 10 for the primary purpose of extending the life of battery 17 when computer 10 is disconnected from an external power source, PMGR 11 provides for a number of control and monitoring functions for this purpose. PMGR 11 is utilized to cause computer 10 to be in one of three separate modes of operation. The three modes are the normal, slow and sleep modes. PMGR 11 responds to each of these modes by controlling the clocking signal being sent to a given device and/or controlling the voltage being supplied to a given unit. The clock signals coupled from the clock oscillator 16 to PMGR 11 are coupled to the clock control unit 27. Clock control unit 27 operates as a switch to couple the various clock signals on lines 41, 42 and 43 to CPU 12, serial communication controller unit 21 and the disk controller unit 20, respectively.

A power supply 29, which receives its power from battery 17, provides the needed voltages to computer 10. These supply voltages, shown as Vcc's in FIG. 1, are coupled through PMGR 11, wherein PMGR 11 provides separate Vcc sources to the various units through the analog interface unit 26. As shown in FIG. 1, VccA is coupled to the CPU 12 and related units. Three other separate Vcc sources are also provided from PMGR 11 as dedicated Vcc voltages to serial communication drivers 22, sound unit 24 and to the modem 25 through analog interface unit 26. These voltages are designated as VccB, VccC and VccD, respectively. It is to be noted that control lines are also present between PMGR 11 and clock control unit 27 and between PMGR 11 and analog interface unit 26. In the preferred embodiment, analog interface unit 26 is comprised of a plurality of transitor switches for switching the various Vcc sources onto their corresponding lines. The clock control unit 27 also includes various switches for coupling the clock signals to the corresponding units. Further, it is to be appreciated that PMGR 11 also includes circuitry for the various clocking signals for distribution onto lines 41–43. It is to be noted that PMGR 11 can change the various clocking rates of the clocking signals present on lines 41–43.

In the normal (or wake) mode of operation, computer 10 is fully active and all of the switches within clock control unit 27 and the analog interface unit 26 are closed. However, commands can be provided by CPU 12 automatically in response to stored routines, or in response to a user input through I/O unit 19, to deactivate transistor switches which couple VccB, VccC and VccD, in order to remove the applicable Vcc power from the serial communication controller drivers 22, sound drivers of unit 24 and modem 25. Alternatively, in order to conserve power of the battery, Vcc voltages for powering units 22, 24 and 25 need not be applied until such unit usage is requested by the system or the user.

In order to further conserve power, PMGR 11 will send computer 10 into a sleep (inactive) mode under an occurrence of either of two conditions. When the battery charger circuit 18 notes that battery 17 has dropped to a predetermined level, which level is deemed to be detrimental to further operation of computer 10, PMGR 11 places computer 10 into a sleep mode. PMGR 11 can also enter the sleep mode when a sleep command is provided by CPU 12. CPU sends a sleep command to PMGR 11 when there has been no user activity for a predetermined amount of time or when the user decides to stop work and shut down the computer 10.

Before entering the sleep mode, the operating system of the computer, as well as the various drivers, save the current state information in RAM 14. Thus, the state of the various registers, drivers and other memory devices are stored within RAM 14 for later restoration. Once these necessary states are stored in RAM 14, PMGR 11 releases all of the switches in analog interface unit 26 so that power is removed from the various units of computer 10. It is to be noted that power is removed from RAM 14 if RAM 14 is comprised of non-volatile memory such as an EPROM, which is the case with the memory device 14 of the present invention. However, if RAM 14 is comprised of volatile memory then the transistor switch applying Vcc power to RAM 14 is kept closed so that Vcc is still applied to RAM 14 keeping it active in order to retain the stored information. It is to be noted that non-volatile memory is preferred so that Vcc need not be applied to RAM 14 in the sleep mode. Further, it is to be noted that the preferred embodiment uses CMOS memory.

In an alternative embodiment, VccA can be coupled onto line 45 in order to keep the power supplied to CPU 12. The internal clock of PMGR 11 can be decoupled from CPU 12 by clock control unit 27 thereby disabling the clock input to CPU 12 and halting the execution of the CPU. The CPU internal states are frozen with all CPU internal RAM and control registers remaining intact by halting the execution of the CPU. Halting the execution of CPU 12 typically will lower its power consumption by two orders of magnitude.

Although a number of conditions can cause computer 10 to wake from the sleep mode, computer 10 of the present invention has three possible conditions which triggers it to leave the sleep mode. PMGR 11 continues to monitor lines 37 such that any input from I/O controller 19a will cause computer 10 to wake from the sleep state. The I/O input is typically a pressing of a key on the keyboard and/or the movement of the cursor control device. The second condition for waking up computer 10 occurs if the wake up timer (alarm clock) within PMGR 11 had been enabled and matches the real time clock within PMGR 11. Upon the activation of the alarm clock, PMGR wakes computer 10 from its sleep state. Finally, the third condition of computer 10 occurs if PMGR 11 was set to monitor the detection of a ring signal from modem 25. If an incoming signal is received by modem 25, the ring signal is detected by PMGR 11 and causes computer 10 to awake from its sleep state.

Upon waking, computer 10 accesses RAM 14 to retrieve the stored state of the various units for restoring computer 10 to the state it was in prior to entering the sleep mode. Further, upon waking, computer 10 initiates a diagnostic routine for ensuring proper operation of computer 10.

The third mode of operation of computer 10 is known as the slow mode. The slow mode is a condition similar to the active mode, except that the clock rate of the clocking signal to the various units is slowed. That is, by reducing the clock rate of computer 10, as much as 25–30% of power savings can be obtained. Although all of the clocking signals on lines 41–43 can be slowed, it is to be noted that the clock signal on each line can be slowed. Slowing the clock rate of the clocking signal on line 41 to CPU 12 can achieve 25–30% savings in power.

Furthermore, the slow mode is entered from the normal mode when no activity has been detected after a predetermined time period, this time period being less than the time period for placing the system into the sleep mode. Thus, if no activity occurs for a certain duration, computer 10 enters the slow mode first and if the non-active cycle continues, computer 10 will eventually enter the sleep mode after an additional time period.

The slow state can be entered and departed by user command or CPU command. It is appreciated that clock signals to units 20 and 21 can be decoupled by clock control unit 27, wherein units 20 and 21 are deactivated and will not lose the current internal states of those units.

Referring to FIG. 2, a transistor switch 50 utilized in the clock control unit 27 is shown. It is to be appreciated that only one switch 50 is shown, however, the actual clock control unit 27 is comprised of a plurality of these switches 50. A clock signal from PMGR 11 is coupled through transistor 51 to its corresponding device 52. The control signal is also obtained from PMGR 11 and is coupled to the gate of the transistor 51. When transistor 51 is made active by the control signal, the clock signal is coupled to device 52. Typically, device 52 is a CMOS device so that when the clock signal is removed from this CMOS device, the device shuts down and consumes none or very little power. It is to be noted that in some of the devices, such as units 20 and 21, the clock signal can be decoupled from these devices while the Vcc supply to these devices are present.

Referring to FIG. 3, a transistor switch 54 comprising one of the switches within analog interface unit 26 is shown. However, it is to be noted that a plurality of these switches reside within analog interface unit 26. One of the Vcc lines is coupled from PMGR 11 through transistor 55 to device 56. A control line also from PMGR 11 is coupled to the gate of transistor 55 for controlling the coupling of Vcc to device 56 through transistor 55. It is to be noted that power is supplied to device 56 when transistor 55 is made active and that device 56 may not necessarily be a CMOS device since power will be removed from device 56 when transistor 55 is cut off.

It is to be appreciated that the above description in reference to FIGS. 1-3 can be represented in various other circuit equivalent forms without departing from the spirit and scope of the invention. Further, in reference to FIG. 1, the actual devices and the switching of the power and clock signals can be readily adapted to operate with other designs without departing from the spirit and scope of the present invention. However, in order to provide a more detailed workings of the present invention, various specific details pertaining to the preferred embodiment are disclosed below. CPU 12 provides various commands to PMGR 11 for connecting the Vcc power to applicable devices as needed. Further, clock signals can be either disconnected from various devices, or in the alternative, PMGR 11 can provide different clock speeds, such as during the slow mode. CPU 12 can be made to provide these commands in response to a stored routine or in response to a monitoring function of the PMGR or in response to a user interaction through I/O unit 19.

It is to be noted that the various drivers of computer 10 are responsible for powering on and off their respective peripheral devices. It is to be noted that drivers of computer 10 can be hardware or software drivers, or a combination thereof, and the preferred embodiment uses software drivers. That is, software is used to control the powering on and off the respective devices. Thus, the power to the disk control unit 20 also powers the floppy disk, the power to the parallel communications controller 23 also powers its associated peripheral device, such as the hard disk. The drivers of the serial communications controller 21 and the power to the sound drivers 24 also are controlled as needed. These drivers are responsible for maintaining the time that these devices are powered to a minimum in order to conserve power. Thus, they are only activated when a given particular device is needed. Generally, each device driver will enable its peripheral device when the driver is needed.

In the case of the floppy disk controller 20, the power is only applied to the peripheral device when an actual disk read or write is under way. Also, in the instance with the modem 25, it is kept without power until a ring is detected by PMGR 11 or when activated by the CPU 12. As stated previously those devices that have system clock inputs are enabled/disabled by controlling their connection to the clock. They can remain powered even though the rest of the system is off, thereby retaining their internal states, but consuming less power. As such, clock control devices do not need be re-initialized or re-enabled when their clock is turned off. Those devices that do not have a clock input or do not require any state to be retain are enabled/disabled by controlling their connection to power. As stated previously, the power can be removed from CPU 12 in which case the internal states of CPU 12 are stored in RAM 14 prior to power down. It is to be stressed that the clock input can be removed from CPU 12 in which case the internal states of CPU 12 are retained. In reference to the battery charger circuit 18, the circuit charges the battery when coupled to an external power source, but circuit 18 is also utilized to monitor battery 17. PMGR 11 monitors the power level of battery 17 and alerts the user when that level drops to a predetermined level, permitting the user to finish the current job of the computer and shutting down the computer prior to complete breakdown of computer 10. An analog-to-digital converter within PMGR 11 provides for the conversion of the analog battery voltage to a digital signal. Although not shown in FIG. 1, a temperature sensing mechanism is also coupled to a PMGR 11 to sense the temperature and another analog-to-digital converter within PMGR 11 is also used to convert this analog signal to a digital signal.

It is to be appreciated that the PMGR 11 of the preferred embodiment of the present invention provides for a variety of techniques to monitor and control the distribution of power and clocking signals in order to conserve the time that computer 10 can be self-sustaining when decoupled from an external power source.

We claim:

1. A portable personal computer including a central processing unit (CPU), a memory unit for storing data and programs for the operation of the CPU, a user interactive device, a plurality of peripheral devices including a modem, clock signal generation means for generating a clock signal to some of the plurality of peripheral devices and the CPU, a battery for powering the CPU, the memory unit, the user interactive device, the clock signal generation means, the plurality of peripheral devices, and an apparatus for managing the use of power from the battery to the CPU, the memory unit, and the plurality of peripheral devices, wherein the apparatus for managing the use of power comprises:

(A) first switching means coupled to the CPU, the memory unit, the plurality of peripheral devices, and the battery for distributing the power from the battery to the CPU, the memory unit, and the plurality of peripheral devices, wherein the first switching means includes a plurality of first switches, each coupling the power to the CPU, the memory unit, and a respective one of the plurality of peripheral devices;

(B) second switching means coupled to the CPU, the some of the plurality of peripheral devices, and the clock signal generation means for distributing the clock signal from the clock signal generation means to the CPU and the some of the plurality of peripheral devices, wherein the second switching means includes a plurality of second switches, each coupling the clock signal to the CPU, and a respective one of the some of the plurality of peripheral devices;

(C) power managing means coupled to the CPU through a via means, to the user interactive device, to one of the plurality of peripheral devices, to the clock signal generation means, to the battery, to the first switching means, and to the second switching means for controlling the distribution of the power from the battery to the CPU, the memory unit, and the plurality of peripheral devices, and for controlling the distribution of the clock signal from the clock signal generation means to the CPU and the some of the plurality of peripheral devices, wherein the power managing means in an intelligent assistant to the CPU, wherein the power managing means further comprises (1) timing means;

(2) memory means for storing data and programs for the operation of the power managing means;

(3) interfacing means coupled to the user interactive device and the one of the plurality of peripheral devices for interfacing the user interactive device and the one of the plurality of peripheral devices; and (4) circuitry for running the programs stored in the memory means, wherein the power managing means communicates with the CPU via the via means, wherein the power managing means receives commands from the CPU and transfers data to and from the CPU, wherein the via means performs handshake operation to the commands and the data transferred, wherein when the CPU wants to send an output data to the user interactive device, the output data is first sent to the power managing means from the CPU, wherein when the user interactive device receives an input data for the CPU, the power managing means receives the input data from the user interactive device and stores the input data until the CPU requests the input data, wherein the power managing means operates to control the distribution of the power to the CPU, the memory unit, and the plurality of peripheral devices under the control of the commands from the CPU and inputs from the user interactive device and the one of the plurality of peripheral devices, wherein the power managing means provides for three modes of operation of the computer, an active mode for providing active operation of the computer, a sleep mode for placing the computer in an inactive state to conserve power and a slow mode in which the frequency of the clock signal is reduced in order to reduce power consumption to the some of the plurality of peripheral devices coupled to receive the clock signal, wherein the power managing means selectively controls the first switching means to provide the power to the plurality of peripheral devices and selectively controls the second switching means to provide the clock signal to the some of the plurality of peripheral devices when needed to be accessed in the active mode, wherein the power managing means controls the first switching means to remove the power from the plurality of peripheral devices in the sleep mode, wherein the power managing means reduces the frequency of the clock signal coupled to the CPU and the some of the plurality of peripheral devices via the second switching means in the slow mode; and (D) monitoring means stored in the memory means of the power managing means for monitoring the user interactive device and the one of the plurality of peripheral devices and providing information of the user interactive device and the one of the plurality of peripheral devices to the power managing means, wherein the monitoring means is a set of program instructions running on the power managing means, wherein the monitoring means monitors the use of the user interactive device and the one of the plurality of peripheral devices at a predetermined time interval provided by the timing means, wherein when the monitoring means detects that the computer is not accessed by said user interactive device and the one of the plurality of peripheral devices for a first predetermined time period in the active mode, the power managing means controls the computer to enter the slow mode in response to a first one of the commands from the CPU, wherein when the monitoring means detects that the computer is not accessed by the user interactive device and the one of the plurality of peripheral devices for a second predetermined time period in the slow mode, the power managing means controls the computer to enter the sleep mode in response to a second one of the commands from the CPU, wherein when the monitoring means detects the inputs from the user interactive device or the one of the plurality of peripheral devices in the slow or sleep mode, the power managing means controls the computer to return to the active mode, wherein the power managing means controls the computer to enter the active mode from the sleep mode by controlling the first switching means to couple the power to the CPU, the memory, and the plurality of peripheral devices and controlling the second switching means to couple the clock signal to the CPU and the some of the plurality of peripheral devices when the monitoring means senses the inputs from the one of the plurality of peripheral devices or from the user interactive device, wherein the power managing means controls the computer to enter the active mode from the slow mode by coupling the clock signal with full frequency to the CPU and some of the pluralty of peripheral devices via the second switching means when the monitoring means senses the inputs from the user interactive device or the one of the plurality of peripheral devices within the second predetermined time period.

2. The apparatus of claim 1, wherein the power managing means comprises a microcontroller.

3. The apparatus of claim 1, wherein the power managing means further includes a wake up timer, wherein the power managing means controls the computer to enter the active mode from the sleep mode when the wake up timer is set by the power managing means to count for and reaches a third predetermined time period.

4. The apparatus of claim 1, wherein the user interactive device comprises a keyboard and a cursor control device.

5. The apparatus of claim 1, wherein the one of the plurality of peripheral devices is the modem.

* * * * *

UNITED STATES PATENT AND TRADEMARK OFFICE
CERTIFICATE OF CORRECTION

PATENT NO : 5,167,024

DATED : November 24, 1992

INVENTOR(S) : R. Steven Smith, et al.

It is certified that error appears in the above-identified patent and that said Letters Patent is hereby corrected as shown below:

In the claims:
Claim 1, Column 11, line 18, "in" should read - -is - -.

Signed and Sealed this

Second Day of March, 1999

Attest:

Attesting Officer

Q. TODD DICKINSON

Acting Commissioner of Patents and Trademarks